(12) United States Patent
Wolf-Monheim

(10) Patent No.: US 10,793,268 B2
(45) Date of Patent: Oct. 6, 2020

(54) HVAC ARRANGEMENT INCLUDING A MOTOR VEHICLE AND A DRONE

(71) Applicant: Ford Global Technologies, LLC, Dearborn, MI (US)

(72) Inventor: Friedrich Peter Wolf-Monheim, Aachen NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 324 days.

(21) Appl. No.: 15/991,299

(22) Filed: May 29, 2018

(65) Prior Publication Data
US 2018/0346117 A1    Dec. 6, 2018

(30) Foreign Application Priority Data
May 31, 2017   (DE) .......................... 10 2017 209 220

(51) Int. Cl.
*B64C 39/02*   (2006.01)
*B62D 63/02*   (2006.01)
*B64C 29/00*   (2006.01)
*B62D 25/06*   (2006.01)

(52) U.S. Cl.
CPC ............ *B64C 39/024* (2013.01); *B62D 25/06* (2013.01); *B62D 63/025* (2013.01); *B64C 29/0091* (2013.01); *B64C 2201/042* (2013.01); *B64C 2201/108* (2013.01)

(58) Field of Classification Search
CPC ... B64C 2201/208; B64C 39/024; B60R 9/00; B60W 30/00
See application file for complete search history.

(56) References Cited

U.S. PATENT DOCUMENTS

| 9,409,644 | B2 | 8/2016 | Stanek et al. |
| 9,561,871 | B2 | 2/2017 | Sugumaran |
| 2016/0196756 | A1 | 7/2016 | Prakash et al. |
| 2016/0332748 | A1 | 11/2016 | Wang |
| 2018/0237159 | A1* | 8/2018 | Cantrell .................. B64D 1/02 |
| 2019/0031343 | A1* | 1/2019 | Russell .................... B60S 3/04 |
| 2019/0066359 | A1* | 2/2019 | Chen ...................... A63F 13/25 |

(Continued)

FOREIGN PATENT DOCUMENTS

| DE | 102015110812 A1 | 1/2016 |
| DE | 102015012369 A1 | 10/2016 |

(Continued)

OTHER PUBLICATIONS

Sam Estrin, "Land Rover's Bespoke Rescue Vehicle Features a Roof Mounted Drone," Drone Universities, Apr. 11, 2017 pp. 1-3.

*Primary Examiner* — Ryan Rink
(74) *Attorney, Agent, or Firm* — Brooks Kushman PC; Gregory P. Brown

(57) ABSTRACT

An air-conditioning system includes a motor vehicle, in particular a passenger vehicle, and a drone. The drone is configured to be secured, in a secured state, to the motor vehicle and released from the motor vehicle. The drone is a flying drone that is driven using propellers. The drone, in the secured state, serves to air-condition the motor vehicle using the propellers by pushing air into the passenger vehicle through a roof of the vehicle. The roof defines openings that correspond to a propeller circumference that allow air, generated by the propellers, to flow into the passenger vehicle.

15 Claims, 1 Drawing Sheet

(56) References Cited

U.S. PATENT DOCUMENTS

2019/0070995 A1* 3/2019 Cantrell .................. B64F 1/222
2020/0055403 A1* 2/2020 Overstreet ................ F03D 9/32

FOREIGN PATENT DOCUMENTS

| | | |
|---|---|---|
| DE | 102015207979 A1 | 11/2016 |
| DE | 102015007156 A1 | 12/2016 |
| DE | 102016011656 A1 | 3/2017 |
| DE | 102015117227 A1 | 4/2017 |
| DE | 102016219473 A1 | 4/2018 |
| FR | 2986647 A3 | 8/2013 |
| GB | 2529896 A | 3/2016 |
| WO | 2007141795 A1 | 12/2007 |

* cited by examiner

HVAC ARRANGEMENT INCLUDING A MOTOR VEHICLE AND A DRONE

CROSS-REFERENCE TO RELATED APPLICATIONS

This application claims foreign priority benefits under 35 U.S.C. § 119(a)-(d) to DE Application 10 2017 209 220.3 filed May 31, 2017, which is hereby incorporated by reference in its entirety.

TECHNICAL FIELD

The disclosure relates to a heating and ventilation arrangement for a motor vehicle using a drone.

BACKGROUND

It is known to use drones and motor vehicles together or to drop drones from these motor vehicles and to pick them up thereon in order, for example, to provide information relating to the environment by means of the drone for the vehicle, et cetera.

Drones are, in this instance, not intended to refer to unmanned vehicles in general, but instead unmanned aircraft and in particular unmanned multi-rotor flying devices, such as quadrocopters, hexacopters, octocopters, et cetera.

DE 10 2015 110 812 A1 thus discloses a motor vehicle drone application system that comprises at least one vehicle, and a drone, which can be used and is configured to be secured to the vehicle and released from the vehicle. In particular, the disclosure describes that the vehicle and the drone remain in communication with each other in order to exchange information whilst the vehicle is operated in an independent travel operating mode so that the capacity of the vehicle in the independent travel operating mode is increased.

If the drone is docked, however, it remains non-operational in principle.

It would therefore be desirable for the costly drones to also carry out, in the docked state, a function that brings added value.

SUMMARY

According to the disclosure, it has been recognized that, when a drone is a flying drone that is driven via propellers, and the drone, in a state of being secured to a motor vehicle, serves to air-condition the motor vehicle using the propellers to provide an advantage in the docked state. Consequently, added value is achieved with regard to an acquisition cost.

That is to say, the drone is used not only to obtain information or load movement in a manner actively set down by the vehicle, but instead can also blow air into an inner side of the motor vehicle via drive rotors or propellers of the drone.

It is therefore preferable for the drone to be arranged on a roof of the motor vehicle in a secured state since a passenger region, or a passenger compartment, that is intended to be air conditioned is in most cases located below the roof where the drone is arranged.

In a preferred embodiment, the roof of the motor vehicle has openings that can be automatically and/or manually closed and/or opened, and coincide with a position of the drone secured to the roof. Consequently, on the one hand, the drone can be used as an air-conditioning system when the openings are open and, on the other hand, for load or freight movement when the openings are closed for protection.

Of course, the openings can also be closed at high speeds, when the drone is not in use or in the event of rain, et cetera.

Preferably, the openings in the roof coincide with propeller circumferences so that an optimum air flow is ensured.

It is particularly preferable for the drone to be a quadrocopter with electric motor drives.

Other features and details of the disclosure will be appreciated from the following description of the drawings, in which:

DETAILED DESCRIPTION

Figure 1:
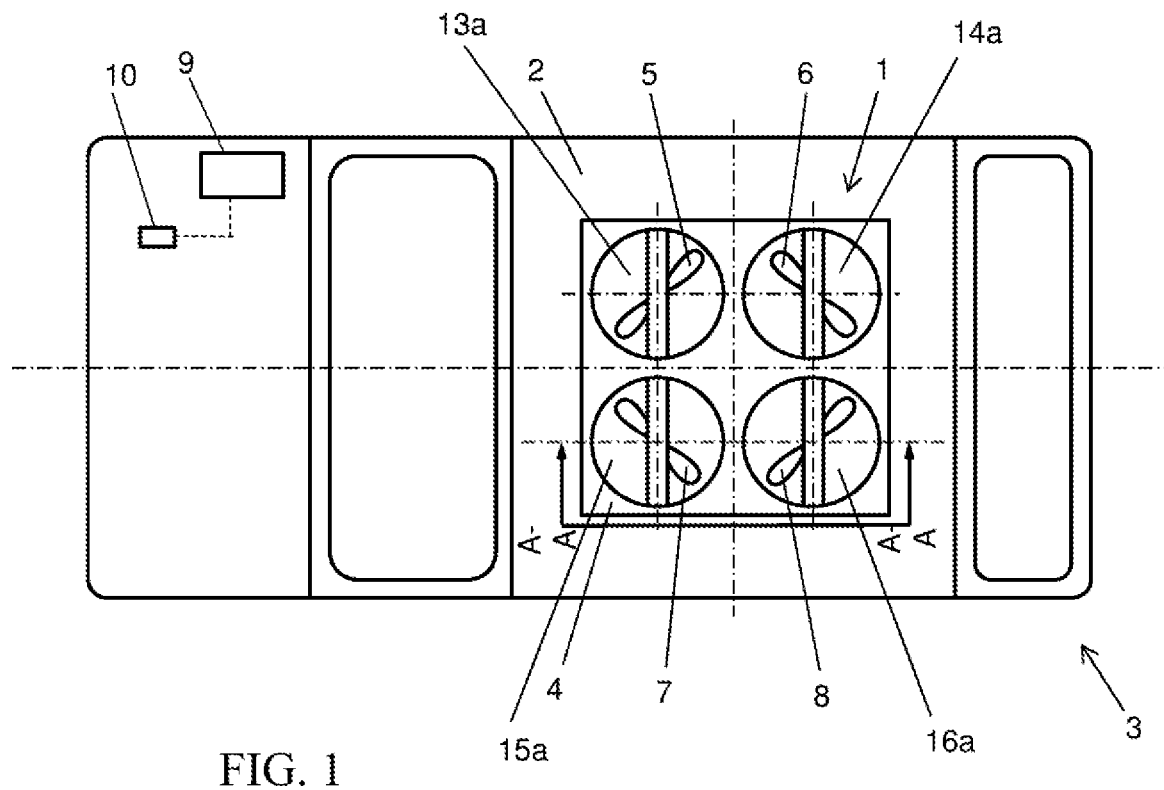
FIG. 1 is a schematic plan view of a passenger vehicle and drone in a docked state.
Figure 2:
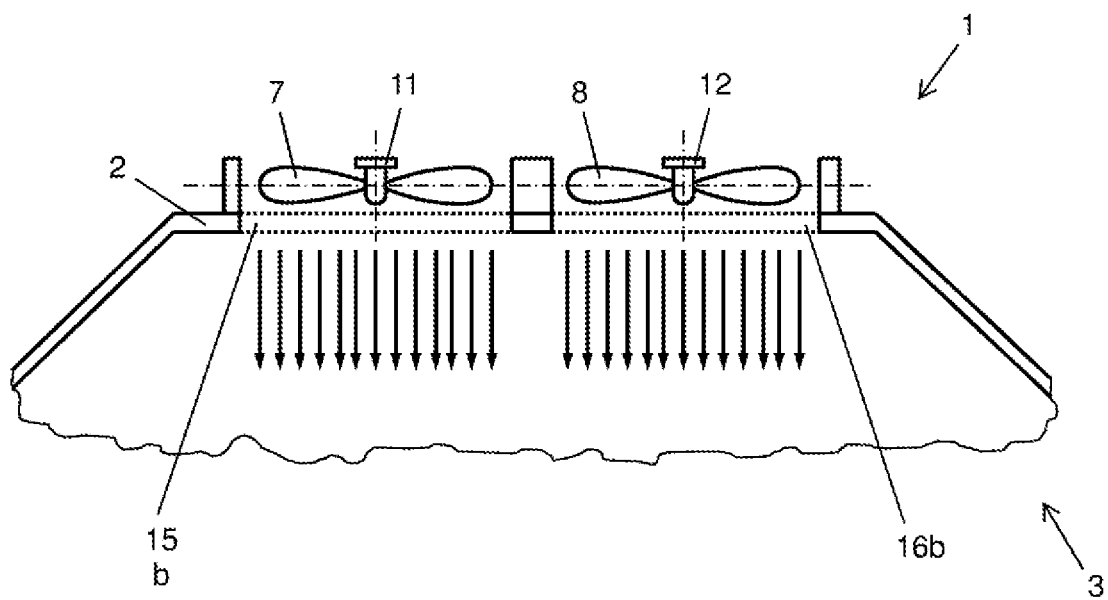
FIG. 2 is a schematic side view of a longitudinal section through a securing region of the drone from FIG. 1 when viewed in the direction of the arrow A-A.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the Figures, a quadrocopter 1 in the form of a drone is secured or docked on a roof 2 of a passenger vehicle 3.

The drone 1 comprises a frame 4 in which four rotors 5, 6, 7, 8 are arranged in a square, aligned with axes of the four rotors 5, 6, 7, 8. The rotors 5, 6, 7, 8 are driven by suitable electric motors 9, 10, 11 and 12 that are secured to bridges (not shown), which bridge openings 13a, 14a, 15a and 16a and are sized in accordance with the four rotors 5, 6, 7, 8.

For reasons of clarity, components, such as the battery or accumulator used to power the electric motors 9, 10, 11 and 12 that drive the rotors 5, 6, 7, 8, are not shown.

In accordance with the openings 13a, 14a, 15a and 16a, corresponding openings 13b, 14b, 15b and 16b are arranged in the roof 2 of the passenger vehicle 3 and aligned on the axes with the openings 13a, 14a, 15a and 16a to ensure optimum air flow into the passenger vehicle 3 in a manner such that the corresponding openings act as a vent.

The corresponding openings 13b, 14b, 15b and 16b are intended to be opened automatically, via a control unit 9, in such a manner that, when the drone 1 is operated as an air-conditioning system, the openings 13b, 14b, 15b and 16b are opened in a motorized manner and closed, via the control unit 9, when switched off, for example when air-conditioning is not necessary or undesirable.

At the same time, the control unit 9 is configured to operate the corresponding openings 13b, 14b, 15b, and 16b in such a manner that operation of the corresponding openings 13b, 14b, 15b and 16b is not carried out for safety reasons from a predetermined speed.

The control unit 9 is also connected to an environmental sensor 10 to ensure that operation of the corresponding openings 13b, 14b, 15b and 16b is such that the corresponding openings 13b, 14b, 15b, and 16b are closed during rain or snowfall. Closing the corresponding openings 13*b*, 14*b*, 15*b*, 16*b* via the control unit 9, causes the rain, snowfall or other precipitation to contact the roof 2.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An air-conditioning system for a motor vehicle, comprising:
   a drone configured to be secured to and released from the motor vehicle, wherein the drone is driven by propellers aligned parallel with a roof of the motor vehicle and perpendicular to the axes of rotation of the propellers, and, in a state of being secured to the motor vehicle, the propellers air-condition the motor vehicle through the roof via air flow through the roof.

2. The air-conditioning system as claimed in claim 1, wherein the drone is secured to the roof of the motor vehicle in a secured state.

3. The air-conditioning system as claimed in claim 2, wherein the roof of the motor vehicle defines openings, having axes, that are automatically or manually closed and opened, and coincide with a position of the drone in the secured state via alignment of the axes of the propellers and the openings.

4. The air-conditioning system as claimed in claim 3, wherein the openings in the roof correspond to propeller circumferences.

5. The air-conditioning system as claimed in claim 3 further comprising a control unit being configured to automatically open and close the openings in the roof.

6. A vehicle comprising:
   a roof having a drone arranged on an exterior surface of the roof, wherein the drone is configured to be secured to and released from the exterior surface and includes propellers aligned on the exterior surface such that axes of the propellers intersect a roof centerline, and, in a secured state on the roof, the propellers air-condition a vehicle interior underneath the roof via air flow through the propellers.

7. The vehicle as claimed in claim 6, wherein the roof defines openings, having axes, that are automatically or manually closed and opened, and coincide with a position of the drone in the secured state via alignment of the axes of the propellers and the openings.

8. The vehicle as claimed in claim 7, wherein the openings defined in the roof define a size that corresponds to propeller circumferences.

9. The vehicle as claimed in claim 7 further comprising a control unit being configured to automatically open and close the openings in the roof.

10. The vehicle as claimed in claim 8 further comprising an environment sensor configured to detect precipitation such that, in response to detected precipitation, the control unit closes the openings.

11. A vehicle roof arrangement comprising:
    a roof having an exterior surface that defines openings extending through the roof; and
    a drone, arranged on the exterior surface and being configured to be secured to and released from the exterior surface, that includes propellers aligned on the exterior surface such that axes of the propellers intersect a roof centerline, and, in a secured state on the roof, the propellers air-condition a vehicle interior underneath the roof via air flow generated by the propellers through the openings into the vehicle interior.

12. The vehicle roof arrangement as claimed in claim 11, wherein the openings, having axes, are automatically or manually closed and opened, and coincide with a position of the drone in the secured state via alignment of the axes of the propellers and the openings.

13. The vehicle roof arrangement as claimed in claim 11, wherein the openings defined in the roof define a size that corresponds to propeller circumferences.

14. The vehicle roof arrangement as claimed in claim 13 further comprising a control unit being configured to automatically open and close the openings in the roof.

15. The vehicle roof arrangement as claimed in claim 14 further comprising an environment sensor configured to detect precipitation such that, in response to detected precipitation, the control unit closes the openings.

* * * * *